Patented Sept. 27, 1938

2,131,371

UNITED STATES PATENT OFFICE 2,131,371

PLASTIC MATERIAL

Gustavus J. Esselen, Swampscott, Mass., assignor to The A. S. Boyle Company, Cincinnati, Ohio, a corporation of Ohio No Drawing. Application February 7, 1935, Serial No. 5,505

8 Claims. (Cl. 106—22)

My present invention relates to plastic materials which before drying have a doughy putty-like consistency and after drying have the general consistency and characteristics of wood. Such materials particularly when containing nitro-cellulose are useful for crack fillers and general repair work, for hand molding, for repairing dents in metal work, for building up or changing the shape of articles, and for many other purposes; but their usefulness has been limited by their high shrinkage during drying and to some extent by their rapid burning qualities, as well as by the inflammability of the solvents they contain. Such materials have not been used to any considerable extent in the manufacture of articles by the use of molds because of the shrinkage which is accompanied by warping, cracking, and change of shape.

My present invention provides plastic non-inflammable or slow burning material having before drying the general character of putty and after drying that of wood, which shrinks but little during drying, does not give off inflammable vapors, keeps its shape well, and is capable of being formed in open molds of tin, lead, plaster of Paris or the like.

The following formula gives a satisfactory product for these purposes:

| | Parts by weight |
|---|---|
| Polymerized vinyl acetate | 18 |
| Dibutyl phthalate | 4 |
| Ethylene dichloride | 72 |
| Carbon tetrachloride | 18 |
| Wood flour | 23 |

The polymerized vinyl acetate which I prefer to employ is sold under the trade name "Vinylite A", and serves as a binder. The dibutyl phthalate toughens the product and renders it less brittle and more rubbery. The ethylene dichloride and the carbon tetrachloride are solvents which disappear on exposure to the air leaving the material hard and wood-like. The wood flour serves as a filler to give bulk and body to the material and the final wood-like characteristics of the dry product.

Other polymerized synthetic resins than vinyl acetate may be employed for instance polymerized vinyl benzene, known by the trade name of "Victron". Also the alkyd resins produced by the interaction of glycerine and phthalic acid, known by the trade name of "Glyptal" may be used as a binder. These resins possess in common the physical characteristic of forming a hard mass which acts as a binder for the cellulosic filler upon evaporation of a solvent substance in which they are dispersed. Many other synthetic resins are known which have the same physical property and all such resins are included within the term "synthetic resin" as used herein.

Other plasticizers may be substituted for dibutyl phthalate, for instance, diethyl or dimethyl phthalate, triacetin, tricresyl phosphate, and the like; also gums, such as ester gum, and dammar gum, or non-drying oils may be used according to the characteristics required of the final product. The solvents employed may also be varied somewhat but I prefer to use those which I have mentioned, all of which are compatible with the other materials and act as solvents for the binders to be employed. The solvents to be used must of course be compatible with the other materials employed, and should be non-inflammable. Any solvent possessing this feature of compatibility may be employed in place of those mentioned by way of example.

Wood flour is the best filler for most purposes. This may be made from a large variety of woods, ranging from soft pine to mahogany, and two or more kinds may be combined to produce different characteristics. Other cellulosic materials may be employed wholly or in part, and small amounts of inorganic filler such as talc or infusorial earth. The proportions of all the materials may be varied somewhat according to the particular use to which the product is to be put.

The following are specimen formulae which give excellent results:

| | Parts by weight |
|---|---|
| "Vinylite A" | 18 |
| Ethylene dichloride | 72 |
| Carbon tetrachloride | 18 |
| Wood flour | 23 |

This gives a harder and less rubbery product than the preceding formula. Both of these products have good adhesion, only slight shrinkage, and are tough when dry.

If "Victron" is to be used the following formula may be employed.

| | Parts by weight |
|---|---|
| "Victron" | 18 |
| Dibutyl phthalate | 4 |
| Ethylene dichloride | 86 |
| Wood flour | 23 |

If "Glyptal" is to be used the following formula is satisfactory:

| | Parts by weight |
|---|---|
| "Glyptal DUX3002" | 24 |
| Chloroform | 94 |
| Japan drier | 5 |
| Wood flour | 36 |

This material has excellent adhesion, only a slight shrinkage, is slightly rubbery, does not give off inflammable vapors and may be molded under pressure without heat.

In making up these materials the resin binder and the plasticizer, if any, are dissolved in the solvent or mixture of solvents to form a smooth solution. The wood flour or filler is then mixed in and the mixing continued until a homogeneous mixture is produced.

In using any of the plastic materials produced as described above, the plastic material is applied and shaped by hand or by tools as required, or the mold is filled and the plastic is allowed to dry in the air or in some cases by the application of gentle heat. When dry it is of a hard wood-like nature, can be cut, bored, planed or sawn with ordinary tools; it will hold nails, tacks and screws and, in fact, becomes a grainless wood. Coloring materials may be added if required.

What I claim is:

1. The plastic composition of matter which before exposure to the air has a doughy putty-like consistency and on more exposure to the air has the general characteristics of wood and is composed chiefly of a cellulosic finely divided filler, a binder of polymerized vinyl acetate, and a compatible volatile solvent, said polymerized vinyl resin being present in an amount sufficient to hold the filler to form a grainless wood after the disappearance of a volatile solvent and without application of heat or pressure, the percentage of polymerized vinyl acetate being substantially 66⅔ percent, based on the weight of the cellulosic filler.

2. The plastic composition of matter which before exposure to the air has a doughy putty-like consistency and on mere exposure to the air has the general characteristics of wood and is composed chiefly of a cellulosic finely divided filler, a binder of polymerized vinyl benzene, and a compatible volatile solvent, said polymerized vinyl benzene being present in an amount sufficient to hold the filler to form a grainless wood after the disappearance of a volatile solvent and without application of heat or pressure, the percentage of polymerized vinyl benzene being substantially 66⅔ percent, based on the weight of the cellulosic filler.

3. The plastic composition of matter which before exposure to the air has a doughy putty-like consistency and on exposure to the air has the general characteristics of wood and is composed chiefly of a cellulosic finely divided filler, a binder of alkyd resin, and a compatible volatile solvent, the percentage of alkyd resin being substantially 75 percent, based on the weight of the cellulosic filler.

4. The plastic composition of matter which before exposure to the air has a doughy putty-like consistency and on exposure to the air has the general characteristics of wood and is composed of:

| | Parts by weight, about |
|---|---|
| Polymerized vinyl resin | 18 |
| Ethylene dichloride | 72 |
| Carbon tetrachloride | 18 |
| Finely divided cellulosic material such as wood flour | 23 |

5. The plastic composition of matter which before exposure to the air has a doughy putty-like consistency and on exposure to the air has the general characteristics of wood and is composed of:

| | Parts by weight, about |
|---|---|
| Polymerized vinyl resin | 18 |
| Ethylene dichloride | 72 |
| Carbon tetrachloride | 18 |
| Dibutyl phthalate | 4 |
| Finely divided cellulosic material such as wood flour | 23 |

6. The plastic composition of matter which before exposure to the air has a doughy putty-like consistency and on exposure to the air has the general characteristics of wood and is composed of:

| | Parts by weight, about |
|---|---|
| Polymerized vinyl benzene | 18 |
| Dibutyl phthalate | 4 |
| Ethylene dichloride | 86 |
| Finely divided cellulosic material such as wood flour | 23 |

7. The plastic composition of matter which before exposure to the air has a doughy putty-like consistency and on exposure to the air has the general characteristics of wood and is composed of:

| | Parts by weight, about |
|---|---|
| Alkyd resin | 24 |
| Chloroform | 94 |
| Japan drier | 5 |
| Finely divided cellulosic material such as wood flour | 36 |

8. A plastic composition of matter which before exposure to the air has a doughy, putty-like consistency and on mere exposure to the air has the general characteristics of wood and is composed chiefly of a cellulosic finely divided filler, and a binder of synthetic resin selected from the group consisting of vinyl resins and alkyd resins, the percentage of synthetic resin being between 66⅔ per cent and 75 per cent, based on the weight of the cellulosic filler.

GUSTAVUS J. ESSELEN.